United States Patent [19]
Alston, Jr. et al.

[11] 3,948,662
[45] Apr. 6, 1976

[54] METHOD OF PROCESSING FILM UNIT WITH PROCESSING SOLUTION WAVE FRONT MODIFYING MEANS

[75] Inventors: William W. Alston, Jr., Somerville; John J. Driscoll, Andover; Richard R. Wareham, Marblehead, all of Mass.

[73] Assignee: Polaroid Corporation, Cambridge, Mass.

[22] Filed: Sept. 20, 1973

[21] Appl. No.: 399,149

Related U.S. Application Data
[62] Division of Ser. No. 246,701, April 24, 1972, Pat. No. 3,779,770.

[52] U.S. Cl............................ 96/63; 96/3; 96/29 R; 96/29 D; 96/76 C; 96/200; 354/304
[51] Int. Cl.² .. G03C 5/24; G03C 5/54; G03C 1/48; G03D 9/02
[58] Field of Search...... 96/76 C, 63, 29 R, 3, 29 D, 96/200; 354/304

[56] References Cited
UNITED STATES PATENTS

| | | |
|---|---|---|
| 2,991,703 | 7/1961 | Eloranta ............................ 354/304 |
| 3,241,468 | 3/1966 | Wolff ................................. 354/304 |
| 3,732,101 | 5/1973 | Land et al. ........................... 96/76 C |
| 3,761,271 | 9/1973 | Rogers et al. ........................ 96/76 C |
| 3,779,770 | 12/1973 | Alston et al. ......................... 96/76 C |

*Primary Examiner*—Roland E. Martin, Jr.
*Assistant Examiner*—Richard L. Schilling
*Attorney, Agent, or Firm*—John S. Vale

[57] ABSTRACT

A photographic film assemblage including a container, a plurality of self-developing film units within the container which are adapted to be sequentially exposed and treated with a liquid processing composition, and members associated with the container so as to form an integral part of the assemblage for controlling the distribution of the liquid processing composition during treatment of a film unit. A photographic apparatus with which the film assemblage is adapted to be used includes structure for locating the distribution control members in operative association with a film unit located in position for exposure and subsequent treatment with the liquid processing composition.

1 Claim, 11 Drawing Figures

METHOD OF PROCESSING FILM UNIT WITH PROCESSING SOLUTION WAVE FRONT MODIFYING MEANS

This is a division of application Ser. No. 246,701, filed on Apr. 24, 1972 (now U.S Pat. No. 3,779,770).

BACKGROUND OF THE INVENTION

1. Field of the Invention

The present invention relates to the field of photography and, more particularly, to photographic film assemblages and photographic apparatus with which the assemblages are adapted to be used.

2. Description of the Prior Art

An important step in the processing of a self developing film unit is the spreading of a liquid processing composition between and in contact with an exposed photosensitive element and a superposed image receiving element to initiate a diffusion transfer process. In order to achieve an optimum quality positive print, it is desirable that the processing fluid be spread such that it covers the entire photoexposed area in a thin uniform layer.

A typical film unit includes a photosensitive element, an image-receiving element which may be superposed on the photosensitive element subsequent to exposure or may be transparent and predisposed on the photosensitive element such that exposure may be made through the image-receiving element, and a rupturable pod or container of processing fluid located at one end of the two elements.

In a typical self-developing photographic system, the film units are arranged in stacked relation within a film container which is adapted to be inserted into the receiving chamber of an appropriate camera to locate the forwardmost film unit in the stack in position for exposure.

Subsequent to exposure, the forwardmost film unit is extracted from the film container and is advanced, pod first, between a pair of pressure applying members mounted within the camera. The pressure applying members exert a compressive force on the pod causing it to rupture and discharge the fluid between the exposed photosensitive element and the superposed image-receiving element. Continued advancement of the film unit between the pressure applying members results in the fluid being advanced along a liquid wave front toward the trailing end of the film unit such that it is progressively distributed over the photoexposed area of the film unit.

The uniformity of the liquid layer is, to a large degree, determined by the initial shape of the liquid wave front. In order to uniformly spread the processing composition over a substantially rectangular or square photoexposed area it is preferable that the wave front be disposed in a substantially straight line which extends outwardly to the lateral margins of the area and is oriented in a direction that is normal to the direction of film advancement between the pressure applying members.

There are several factors which effect the initial shape of the wave front. One is a design of the pod and its rupture characteristics. Another relates to the viscosity and amount of liquid enclosed by the pod. The wave front shape is also influenced by the velocity at which the film unit is advanced through the pressure applying members, the amount of compressive pressure exerted on the film unit, and the resistance to fluid flow at the interfaces between the liquid and the superposed film unit elements.

One of the most commonly observed spread shapes is a tongue shape wherein the wave front progresses more rapidly at the central portion of the photoexposed or image-forming area than out at the lateral margins. This condition may be caused by an uneven distribution of liquid upon initial discharge from the pod, i.e., more liquid being concentrated at the center of the film unit than out at its edges. In the subsequent spreading of the tongue-shaped wave front, it is possible that the corners of the image-forming area at the trailing end of the film unit will be coated with a layer of fluid of reduced depth or thickness, or not be coated at all.

One method employed to compensate for a tongue-shaped wave front has been to provide excess fluid in the pod. Another method has been to equip the camera with spread control devices which serve to modify the shape of the liquid wave front during spreading.

The spread control devices are designed to apply a second compressive force to the central portion of the film unit in the path of the mass of fluid discharged from the pod by the pressure applying members. This serves to retard the central portion of the wave front and cause a flow of liquid in a direction transverse to the direction of film advancement. In this manner, the wave front is modified such that it is substantially straight and is oriented in a direction substantially normal to the parallel sides of the rectangular or square image-forming area.

For example of cameras which are equipped with devices for controlling the distribution of liquid processing composition, reference may be had to U.S. Pat. No. 2,991,703, issued to V. K. Eloranta on July 11, 1961, and U.S. Pat. No. 3,416,427, issued to J. B. Murphy on Dec. 17, 1968, both of which are assigned to the same assignee as the present invention.

SUMMARY OF THE INVENTION

The present invention relates to improvements in systems for controlling the distribution of a liquid processing composition as it is spread between the photosensitive element and the superposed image-receiving element of a film unit.

More specifically, the present invention provides a film assemblage which includes a container, a plurality of self developing film units, and structure associated with the container, such that it forms an integral part of the assemblage, for controlling the distribution of a liquid processing composition as a film unit is advanced between pressure applying members mounted in a camera. Also, photographic apparatus in the form of a camera is provided which includes a housing, a chamber for receiving the film container to locate one of the film units therein in position for exposure, processing or pressure applying means, and means for engaging the container to locate and maintain the distribution control structure associated therewith in operative relation with the film unit located in position for exposure and subsequent treatment with the processing fluid.

After exposure, a film unit is advanced through a withdrawal slot in the container and into engagement with the pressure applying members which cause the film unit pod to rupture and discharge the processing fluid between the superposed photosensitive and image-receiving elements. By continuing to advance the film unit, the pressure applying members spread the fluid toward the trailing end of the film unit and towards the withdrawal slot through which the film unit is being advanced.

In one embodiment, the distribution control members may include projections located near the film container withdrawal slot that they extend into the path of travel of the film unit and selectively apply compressive pressure to a central portion of the film unit in the path of the advancing liquid front as the film unit is being extracted from the container. In effect, the rapidly advancing central portion of the liquid front is retarded which causes the liquid to flow transversely of the direction of film advancement thereby modifying the shape of the spread such that it is substantially straight.

In other embodiments, the forward wall of the container includes distribution control recesses, or is configured to have selective sections thereof removed, such that a portion of the forward wall, intermediate the recesses or removed sections, engages the central portion of the film unit to selectively retard the wave front as the film unit is advanced through the withdrawal slot.

In a preferred embodiment the film container is formed of a thermoplastic material and includes relatively thin walls, one of which supports the distribution control members. Advantageously, the camera is provided with a receiving chamber which includes surfaces for engaging and restraining any movement or distortion of the film container walls, thereby serving to accurately locate the distribution control members in operative association with a film unit located in position for exposure and subsequent treatment with the liquid processing composition.

A major advantage of incorporating the distribution control members into the film container is that they may be specifically designed to optimize the spreading characteristics of the particular type of film stored therein. For example, the processing fluid pod construction and rupture characteristics, and the viscosity and amount of fluid contained therein may significantly differ in black and white and color film units. When advanced through the same pressure applying members, at the same velocity, the shape of the liquid wave front may be significantly different for each type of film unit and thereby require distribution control members which vary in size, shape, disposition relative to the film unit, and the amount of pressure applied thereto. If the distribution control members are permanently mounted in a camera which is adapted to accept more than one type of film unit, their design may be, at best, a compromise.

Another significant advantage of mounting the distribution control member in the film container relates to economics. Since the control members are only utilized to process the number of film units within the container and are then discarded, they may be advantageously formed of a low cost plastic material. On the other hand, when they are permanently mounted in the camera they are generally formed of a metal to minimize the amount of wear on their bearing surfaces in view of the significant number of film units to be processed.

Also, by removing the distribution control member from the camera housing, a saving of space is realized which may be utilized to house structure for providing another function or reduce the overall dimensions of the camera.

Therefore, it is an object of the present invention to provide a photographic film assemblage including a container, a film unit within the container which is adapted to be treated with a liquid processing composition and means associated with the container to form an integral part of the assemblage for controlling the distribution of the processing composition during treatment of the film unit.

Another object of the present invention is to provide a photographic film assemblage which is adapted for use with photographic apparatus of the type including pressure applying means for spreading a liquid processing composition between superposed elements of a film unit and the assemblage includes a container having means for controlling the distribution of the liquid processing composition as it is spread by the pressure applying means.

It is yet another object of the present invention to provide photographic apparatus adapted for use with a photographic film assemblage of the type including a container, a plurality of film units adapted to be sequentially exposed and treated with a liquid processing composition, and means for controlling the distribution of the processing composition during treatment of the film unit and the apparatus includes a housing, means for receiving and supporting the container to locate a film unit in position for exposure, and means for locating the distribution control means in operative association with the film unit located in position for exposure.

Another object of the invention is to provide a system for spreading a liquid processing composition between superposed elements of a film unit which features photographic apparatus including pressure applying members for spreading the processing fluid and a film assemblage which includes a film container having structure associated therewith for controlling the distribution of fluid during spreading such that several different types of film assemblages may be used with the same photographic apparatus and each different assemblage may include distribution control members which are designed to optimize the spreading characteristic of a particular type of film unit contained therein.

Other objects of the invention will, in part, be obvious and will, in part, appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
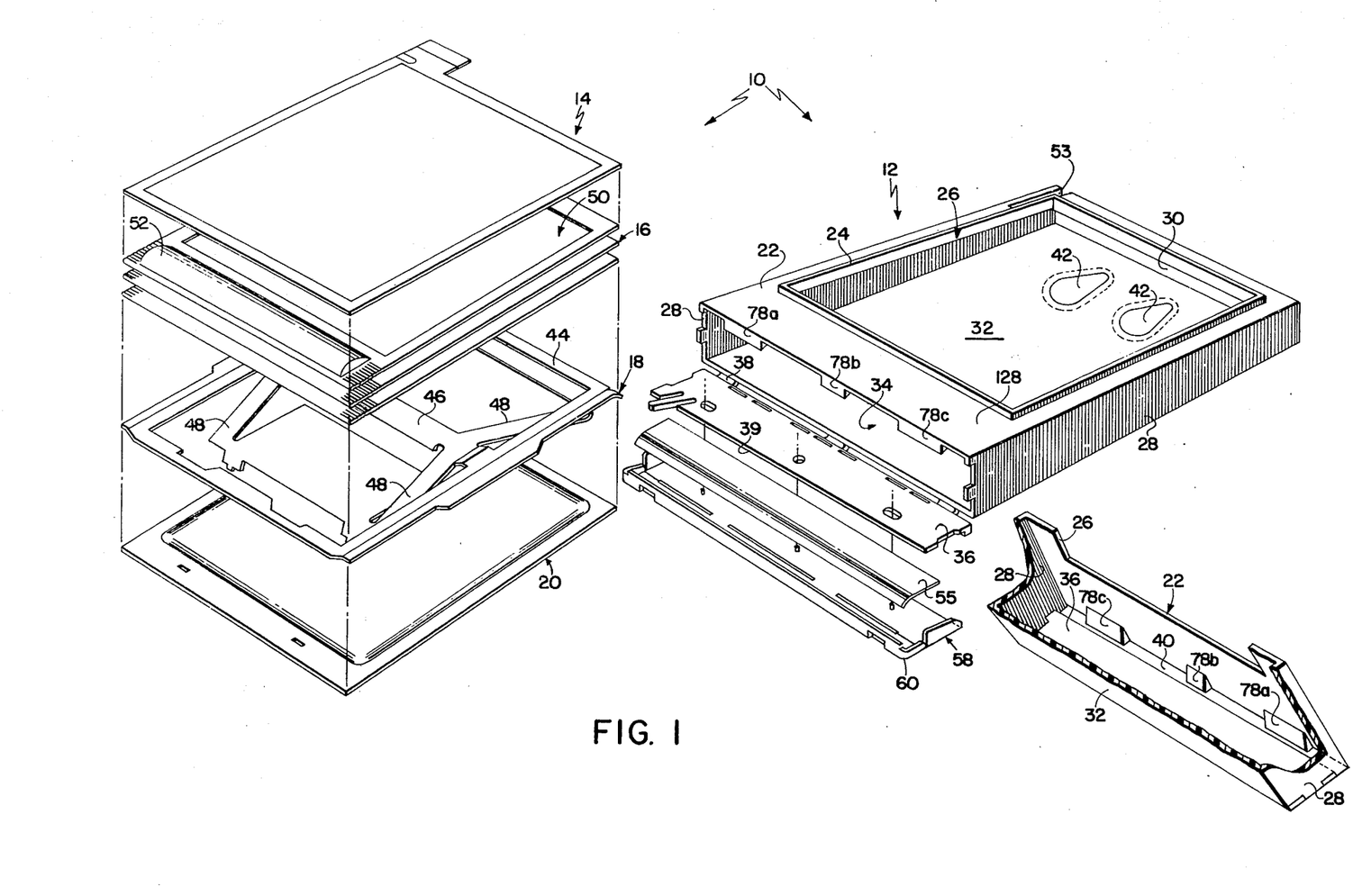
FIG. 1 is an exploded perspective view of a photographic film assemblage embodying the instant invention showing the construction and location of various components of the assemblage.

The components of a photographic film assemblage 10 embodying the instant invention are shown in exploded fashion in FIG. 1 of the drawings. They include a box-like film container 12 and its contents, dark slide 14, a plurality of self-developing film units 16, a film support member 18, and preferably an electrical battery 20.

Film container 12 is preferably molded of an opaque thermoplastic material, such as polystyrene, and includes relatively thin, substantially planar walls. A forward wall 22 includes a generally rectangular upstanding rib 24 which defines the bounds of a generally rectangular light-transmitting section or exposure aperture 26. Depending from three sides of forward wall 22 are a pair of side wall 28 and a trailing end wall 30 which serve to space a substantially planar rear wall 32 from forward wall 22.

The leading ends of forward wall 22, side walls 28, and rear wall 32 cooperated to define an elongated rectangular opening 34 at the leading end of container 12 through which the contents may be inserted. After insertion, a leading end wall 36 which is preferably coupled to the leading end of rear wall 32 by integrally formed flexible hinges 38, may be rotated 90° and joined to the leading ends of side walls 28, and rear wall 32 by any suitable method such as ultrasonic welding.

It will be noted that when leading end wall 36 is located in its closed position, its top edge 39 is spaced from the leading end of forward wall 22 such that an elongated withdrawal slot 40 is formed therebetween (see FIG. 3) through which dark slide 14 and film units 16 may be sequentially extracted from container 12.

The contents of film container 12 are preferably arranged therein in the stacked relation shown in FIG. 1. Battery 20 is substantially flat and is positioned over the interior surface of rear wall 32 such that two electrodes on the underside of the battery (not shown) are aligned with a pair of tear-drop shaped openings 42 in rear wall 32. When container 12 is operatively positioned in a suitable camera, a pair of electrical contacts mounted therein are adapted to extend through openings 42 for coupling battery 20 to the camera's electrical system which may include an automatic exposure control circuit, a flash mode circuit, and electrically driven film advance and processing mechanisms.

Positioned between the stack of film units 16 and battery 20 is the film support member 18 which serves to spring bias the film units 16 towards the interior surface of forward wall 22. Preferably, support member 18 includes a rectangular open support frame 44 for engaging the peripheral margins of the rearwardmost film unit in the stack, and a generally H-shaped center section 46 coupled to support frame 44 and including four resilient legs 48 which bear against battery 20 and provide an upward biasing force.

The film units 16 preferably include a rectangular or square pohotosensitive image-forming area 50, which is surrounded by opaque margins, and a rupturable pod 52, containing a liquid processing composition, located at the leading end of the film unit outside of the bounds of the image-forming area 50. A more detailed discussion of the construction of film units 16 will appear hereinafter.

The film units 16 are arranged in stacked relation on top of support frame 44 with their image-forming areas 50 facing towards the exposure aperture 26 in container forward wall 22. Subsequent to the removal of dark slide 14, the forwardmost film unit 16 bears against the interior surface of forward 22 and is in position for exposure to actinic radiation transmitted through exposure aperture 26.

It will be noted that the leading end of the forwardmost film unit 16, containing pod 52 is also aligned with withdrawal slot 40 at the leading end of container 12. Subsequent to exposure, the forwardmost film unit is adapted to be engaged by a film advancing mechanism in the camera and moved out of container 12 through slot 40 for processing. Access for engaging the trailing end of the forwardmost film unit to move it forwardly through slot 40 is provided by an opening 53 located in forward wall 22 and the trailing end wall 30 of container 12.

Dark slide 14 is formed of any suitable opaque material such as cardboard, paper, or plastic and is initially positioned between the forwardmost film unit 16 and the interior surface of forward wall 22. It serves to light seal exposure aperture 26 and opening 53. Once film container 12 is located at its operative position within a camera, it may be removed through withdrawal slot 40 in the same manner as the forwardmost film unit 16.

In order to light seal withdrawal slot 40, container 12 is preferably provided with an opaque flexible sheet 55 which is secured at one end to exterior surface of leading end wall 36 and is disposed in closing relation to slot 40. This sheet forms a primary light seal for blocking light when container 12 is located within a camera. A secondary light shield for blocking slot 40 prior to inserting container 12 into the camera may also be provided in the form of an end cap member 58. Member 58 is coupled to leading end wall 36 and includes an end cap 60 which is initially positioned in closing relation to the primary light seal 55 and withdrawal slot 40 and may be pivoted to an open position in response to inserting container 12 into the camera. For details as to the construction and operation of end cap member 58, reference may be had to the copending application of Nicholas Gold, Ser. No. 213,989, filed on Dec. 30, 1971, now U.S. Pat. No. 3,748,984, which is also assigned to the same assignee as the present invention.

Figure 2:
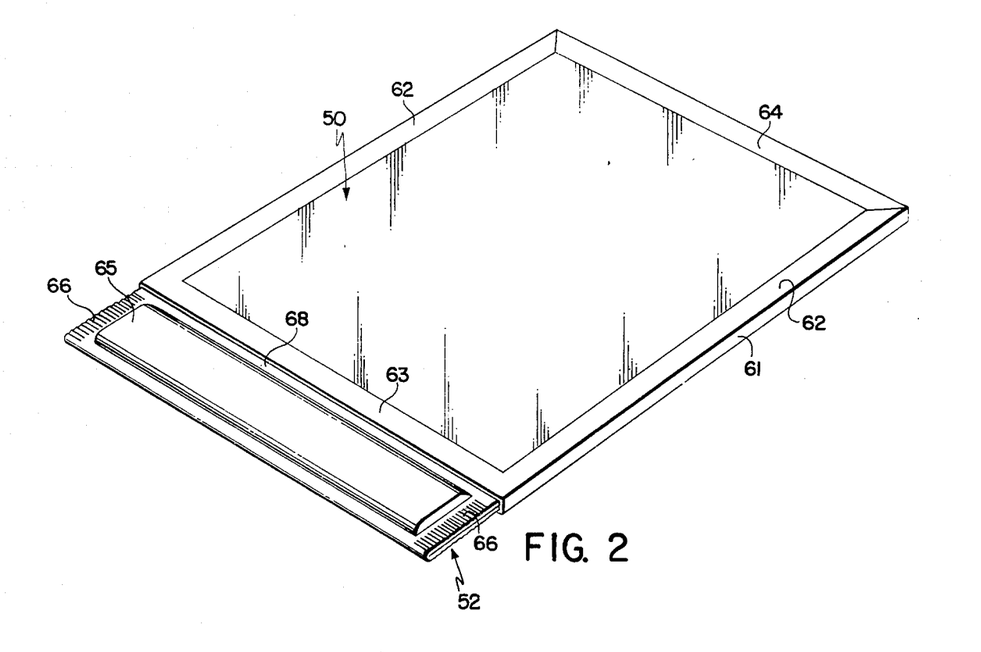
FIG. 2 is a perspective view of a self-developing film unit.
Figure 3:
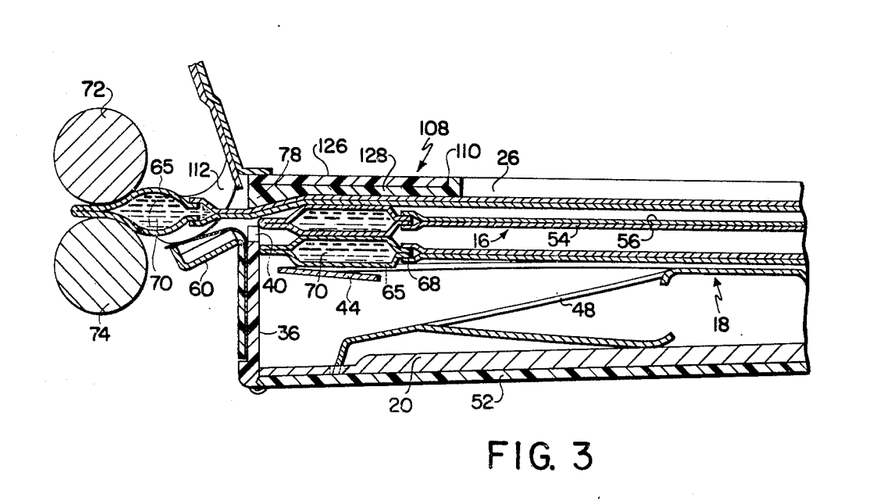
FIG. 3 is an enlarged elevational view, partly in section, of a portion of the film assemblage and camera showing a film unit in operative association with a pair of pressure applying rollers mounted in the camera and distribution control members located in the film container.

Referring now to FIGS. 2 and 3 of the drawing, a typical self-developing film unit 16 generally includes a photosensitive sheet or element 54 and a superposed, transparent image-receiving sheet or element 56 which cooperate to form a laminate. The laminate's structural integrity may also be enhanced or provided, in whole or in part, by providing a binding member 61 which extends around the edges of the laminate. The binding member 61 may take the form of an opaque, pressure-sensitive adhesive tape which also serves to provide lateral margins 62, and leading and trailing end longitudinal margins 63 and 64 bordering the photosensitive image-form area 50.

The rupturable pod 52 preferably comprises a rectangular blank of fluid and air impervious sheet material folded longitudinally upon itself to form two walls 65 which are sealed to one another along their lateral end margins 66 and longitudinal margin 68 to form a cavity in which a liquid processing composition 70 is retained. The longitudinal seal 68 is made weaker than the lateral end seals 66 so as to become unsealed in response to hydraulic pressure generated within the liquid 70 by the application of compressive pressure to the walls 65 of the pod 52.

As best shown in FIG. 3, pod 52 is fixedly secured to the leading ends of the superposed elements 54 and 56 such that the weaker longitudinal seal 68 is positioned to effect an unidirectional discharge of the fluid 70 between the photosensitive element 54 and the image-receiving element 56 upon application of compressive pressure to pod 52.

In use, film unit 16 is subjected to actinic radiation which is directed through the transparent image-receiving element 56 to photo-expose and form latent images in the underlying photosensitive element 54. The film unit then may be advanced, pod 52 first, between a pair of juxtaposed cylindrical rollers 72 and 74 (see FIG. 3) which apply a compressive pressure to the walls 65 of pod 52 and induce a hydraulic pressure in fluid 70 thereby causing seal 68 to rupture. The fluid 70 is discharged, in a mass, between elements 54 and 56, at margin 63, and is spread between and in contact therewith in a thin layer towards margin 64 by rollers 72 and 74, as film unit 16 is further advanced between the rollers, thereby covering the photo-exposed area 50 with the liquid processing composition 70. Processing composition 70 initiates a diffusion transfer process which results in a positive print being formed in the transparent image-receiving sheet 56.

At this point it may be well to explain that the description of film unit 16, as including a photosensitive element 54 and an image-receiving element 56 is an over simplification to aid in illustrating the construction of the film units in the drawings.

As disclosed in U.S. Pat. No. 3,615,644, issued to E. H. Land on Dec. 10, 1968, the film unit generally includes an opaque bottom sheet, a transparent top sheet, and a plurality of individual layers of photographic materials located therebetween to form the laminate. These layers include a photosensitive layer positioned over the bottom sheet, and an image-receiving layer positioned between the photosensitive layer and the top sheet. The term "photosensitive layer" is meant to include one or more individual photosensitive layers. Therefore, when it is stated that the processing fluid 70 is spread between and in contact with elements 54 and 56, it will be understood that the fluid 70 may be spread between any two predetermined adjacent layers in the film unit.

As noted earlier, it is desirable that the layer of processing composition between elements 54 and 56 be of uniform thickness over the entire image-forming area 50 to obtain an optimum quality positive print. It was also noted that the uniformity of the liquid layer is influenced by the initial shape of the wave front of the mass of liquid as it is discharged from pod 52.

Different types of film units tend to have different initial wave front shapes due to variances in their pod design, pod seal rupture characteristics, the amount and viscosity of the liquid processing composition enclosed by the pod, and the resistance to fluid flow at the interface between the fluid and the superposed elements forming the laminate.

Figure 5:
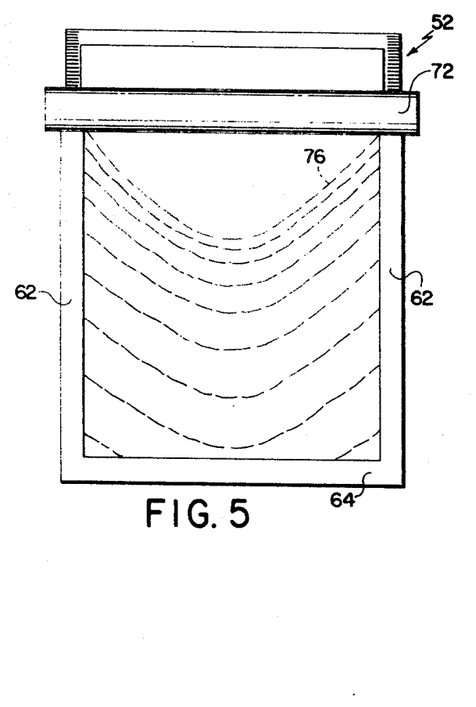
FIG. 5 is an elevational view of a film unit showing the progressive advancement of a liquid wave front, in dotted lines, to illustrate the distribution of processing composition when distribution control members are not utilized in the spread system.

A commonly observed wave front 76 is illustrated in FIG. 5. It is tongue or bow-shaped, i.e., the liquid 70 initially tends to move towards the trailing end of the film unit more rapidly at the central portion of the photo-exposed image-forming area 50 that out at lateral margins 62 thereof. This is generally caused by more fluid being concentrated at the center of pod 50 than out near the end seals 66 and also by the influence of binding member 61 at the lateral margins 62.

As the film unit 16 is advanced, the rollers 72 and 74 progressively spread the fluid 70 (as shown in dotted lines) towards the trailing end margin 64 which may include an integrally formed reservoir or trap for collecting and retaining excess fluid. Because there is an uneven lateral distribution of fluid, the depth or thickness of the layer may be reduced near the corners of the image-forming area 50 at the trailing end of film unit 16.

In order to control the distribution of fluid 70 as it is spread by a pair of pressure applying members mounted within a camera, film assemblage 10 is provided with a distribution control device. Such a device may take the form of one or more members which are adapted to apply a second compressive force to the central portion of the film unit 16 in the path of the liquid wave front 16. The added pressure increases the resistance to fluid flow between elements 54 and 56 at the central portion of the film unit thereby selectively retarding the center of the liquid wave front 76 and causing a flow of fluid outwardly towards the lateral margins 62 of the film unit to cause a more uniform lateral distribution.

In a preferred embodiment the distribution control device may include one or more projections 78 depending from the interior surface of film container forward wall 22 adjacent the withdrawal slot 40 at the leading end of the container.

In the embodiment illustrated in FIGS. 1 and 3, three such projections 78a, 78b, and 78c, are symmetrically disposed about a longitudinal center line of the film container 12. Preferably, projections 78 are formed of a thermoplastic material and are integrally molded with the interior surface of forward wall 22. It will be noted that projections 78 are tapered to increase in depth in the direction of film advancement through withdrawal slot 40 to provide a smooth transition surface between forward wall 22 and withdrawal slot 40.

As best seen in FIG. 3, the projections 78 engage the surface of the forwardmost film unit 16 which includes the image-receiving element 56. This surface of the forwardmost film unit 16 is held in engagement with projections 78 by the upward force of the spring biased support member 18. After the forwardmost film unit 16 has been exposed, it is advanced through withdrawal slot 40 and between the rollers 72 and 74. When pod seal 68 ruptures, the liquid 70 is discharged rearwardly (to the right as viewed in FIG. 3) towards projections 78a–c.

It will be noted that projections 78 are aligned in a straight line which is spaced from, but is substantially parallel to the axes of rotation of rollers 72 and 74 such that the initial discharge of liquid 70 occurs intermediate rollers 72 and 74 and the projections 78. While the projections 78 and support frame 18 cooperate to apply a compressive pressure to pod 52 as it advances through slot 40, the amount of compressive pressure is not sufficient to cause seal 68 to rupture. The initial discharge of liquid 70 is caused solely by the compressive force applied to pod 52 by rollers 72 and 74.

Figure 6:
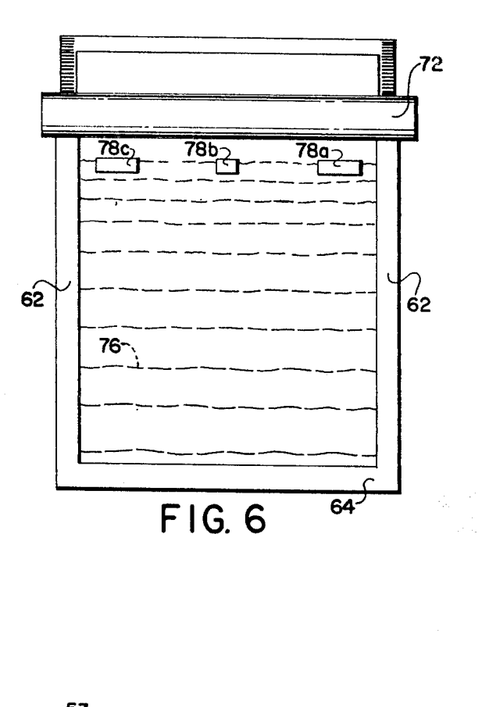
FIG. 6 is an elevational view of a film unit showing progressive advancement of a liquid wave front, in dotted lines, showing the modification of the shape of the wave front caused by the distribution control members.

Continued advancement of the film unit 16 (to the left as viewed in FIG. 3) causes rollers 72 and 74 to spread the liquid 70 towards the trailing end of the film unit. As best shown in FIG. 6, projections 78a, 78b, and 78c modify the shape of the wave front 76 by applying a second compressive force to the central portion of the film unit in the path of the wave front 76. This second compressive force selectively increases the resistance to fluid flow between elements 54 and 56 and retards the advancement of the center portion of the wave front 76.

With rollers 72 and 74 applying the first compressive force behind the mass of liquid 70, and projections 78a, 78b, and 78c applying the second compressive force to the central portion of the fluid flow path in front of the mass of liquid, a portion of the concentration of fluid 70 at the center of the film unit seeks the path of least resistance and tends to flow transversely of the direction of film advancement toward the lateral margins 62 of the film unit 16. Thus the distribution of liquid between the lateral margins 62 becomes more uniform and the shape of the wave front 76 is modified such that it is substantially straight and normal to margins 62.

In FIGS. 1 and 3, the distribution control device is shown to include three separate projections 78a, 78b, and 78c. It must be emphasized that this type of control device is suited for use with a particular type of film unit. With another type of film unit having different pod rupture characteristics or possibly including a fluid having a different viscosity; the projections 78 may have different spacing; they may or may not be symmetrically disposed about the center line of the film container; the number of projections may be increased or decreased to even include only one elongated projection; or, the shape of the projections may be substantially different. For an example of a film unit which includes a rupturable pod that is subdivided into three separate liquid bearing compartments, reference may be had to U.S. Pat. No. 3,621,768, issued to R. J. Chen on Nov. 23, 1971.

Also, the spacing between the bearing surfaces of projections 78 and the rollers 72 and 74 may vary. With one type of film unit, the projections 78 may be set back from withdrawal slot 40 towards the trailing end of the film container 12. With another, it may be desirable to extend the length of forward wall 22 such that the bearing surfaces of projections 78 extend forwardly (to the left as viewed in FIG. 3) of the container leading end wall 36.

Figure 7:
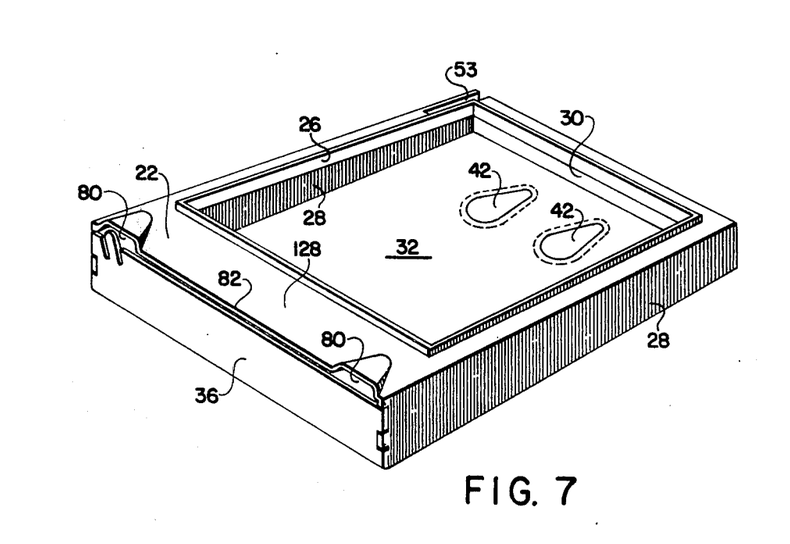
FIG. 7 is a perspective view of a first alternative embodiment of a film container embodying the instant invention.

One alternative embodiment of the present invention, is shown in FIG. 7. It will be noted that the interior surface of the forward wall 22 of the film container 12 includes a pair of recesses 80 adjacent to side walls 28. By selectively elevating portions of interior surface of container forward wall 22 near the withdrawal slot 40, the area of contact between the top surface of the forwardmost film unit 16, and the interior surface of forward wall 22 near withdrawal slot 40, is reduced to that portion 82 of forward wall 22 intermediate recesses 80. Therefore, as the forwardmost film unit 16 is advanced through slot 40, the interior surface of portion 82 bears against the central portion of the film unit 16 and, in cooperation with support member 18, applies the second compressive force to the film unit image-forming area 50 for controlling the distribution of processing composition 70.

Stated another way, container 12 includes a forward wall 22 having a pair of recesses 80 therein which cooperate to define a bearing surface 82 therebetween for selectively engaging a portion of a film unit 16 as it is advanced through withdrawal slot 40 to control the distribution of the liquid processing composition 70 during film processing operations.

Figures 8, 9:
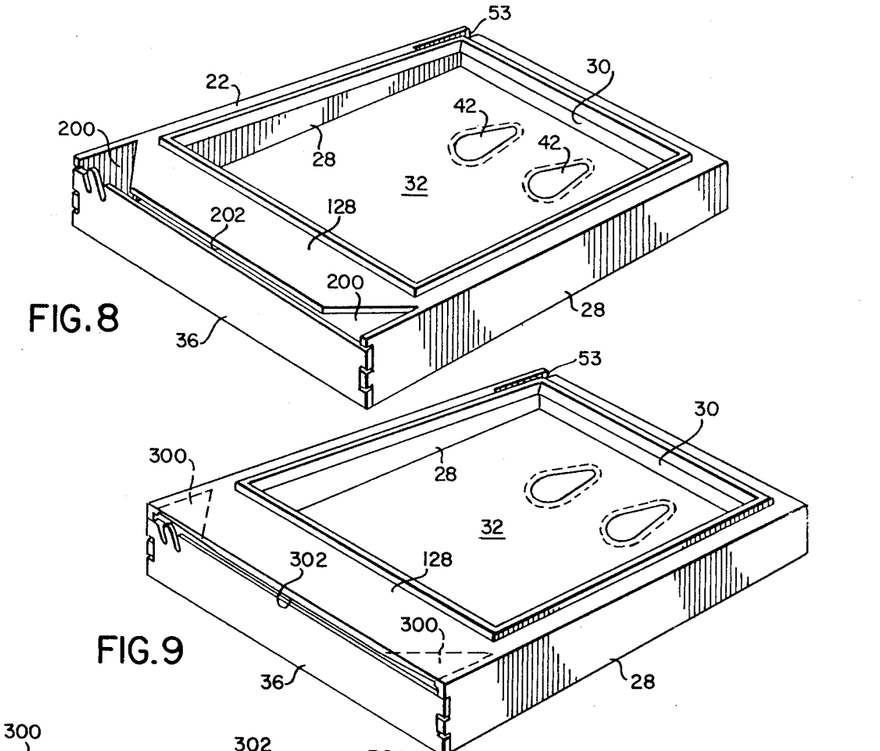
FIG. 8 is a perspective view of a second alternative embodiment of a film container embodying the instant invention.
FIG. 9 is a perspective view of a third alternative embodiment of a film container embodying the instant invention.

Another alternative embodiment of the present invention is shown in FIG. 8. The leading end of container forward wall 22 has two triangular sections, near side walls 28 removed therefrom, which define triangular openings or notches 200. Accordingly, that portion of the interior surface of forward wall 22 which bears against the top surface of the film unit 16 as it is advanced through slot 40 is reduced to bearing surface 202 intermediate openings 200. Operating in a manner similar to the embodiment shown in FIG. 7, the film assemblage 10 includes a film container 12 having openings 200 therein which define a bearing surface 202 therebetween for cooperating with support plate 18 to control the distribution of a liquid processing fluid as it is spread between and in contact with the superposed elements 54 and 56 of the forwardmost film unit 16.

Figures 9A, 9B:
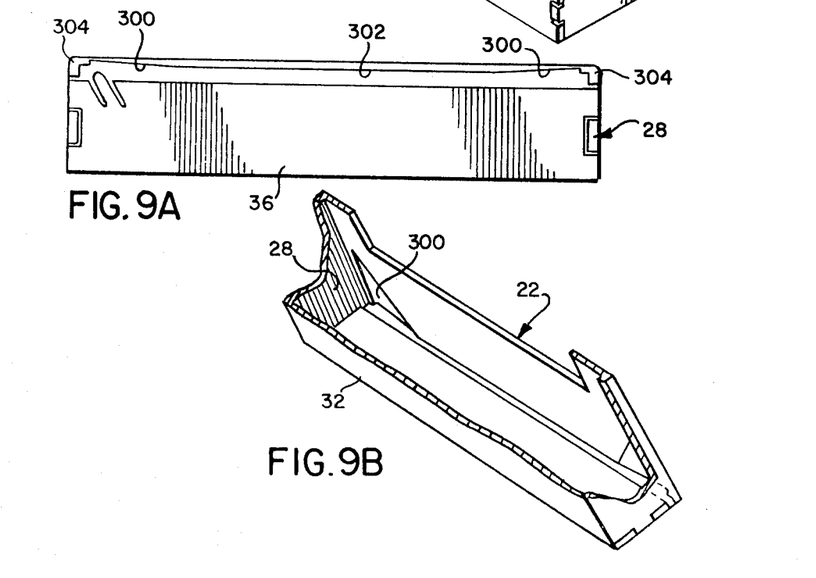
FIG. 9a is an elevational view of the film container of FIG. 9.
FIG. 9b is a perspective view of a section of the film container of FIG. 9.

Still another embodiment of the present invention is shown in FIGS. 9, 9a, and 9b. The interior surface of the leading end of container forward wall 22 has a pair of triangular recesses or depression 300 molded therein to define a forward wall film bearing surface 302 therebetween. As best shown in FIG. 9a, forward wall 22 is relatively thin, i.e., approximately 0.020 of an inch between its interior and exterior surfaces. In a preferred embodiment, the forward wall 22 is tapered in the regions designated 300 to reduce in thickness from 0.020 of an inch near the lateral edges of bearing surface 302 to a reduced thickness approximating 0.005 of an inch near the side walls 28. It will be noted that recesses 300 preferably end short of the side walls 28 at 304 to facilitate molding procedures and to enhance the structural stability of the leading end of the film container 12.

With support member 18 urging the forwardmost film unit 16 against the interior surface of container forward wall 22, the differential in wall thickness between the centrally located bearing surface 302 and the edge recesses 300 causes a compressive pressure to be selectively applied to the central portion of the film unit as it is progressively extracted through withdrawal slot 40 during processing operations. As noted earlier, by selectively applying a second compressive pressure to the film unit in the path of the advancing liquid wave front, the rapidly advancing center of the wave front may be retarded thereby causing a flow of fluid toward the lateral margins 62 of the film unit to achieve a more uniform distribution of processing fluid.

Again, it may be well to point out that the film containers shown in FIGS. 7, 8, and 9 are intended to be illustrative of embodiments wherein the forward wall of the container includes recesses or openings which define the bounds of distribution control means therebetween. The number and location of the recesses or openings will depend on the characteristics of the film units intended to be packaged in these containers.

It will be noted, that while it is not shown in the drawings, each of the film containers 12 shown in FIGS. 7, 8, and 9 preferably includes a light sealing arrangement for withdrawal slot 40 similar to the one shown in FIG. 1 at 55 and 58.

As noted earlier, film assemblage 10 is adapted to be inserted into an appropriate photographic apparatus for sequentially exposing and processing the film units 16 located within film container 12. Such an apparatus may take the form of a compact, folding, single lens reflex camera 84 shown in FIG. 4 in its extended and operative position.

Figure 4:
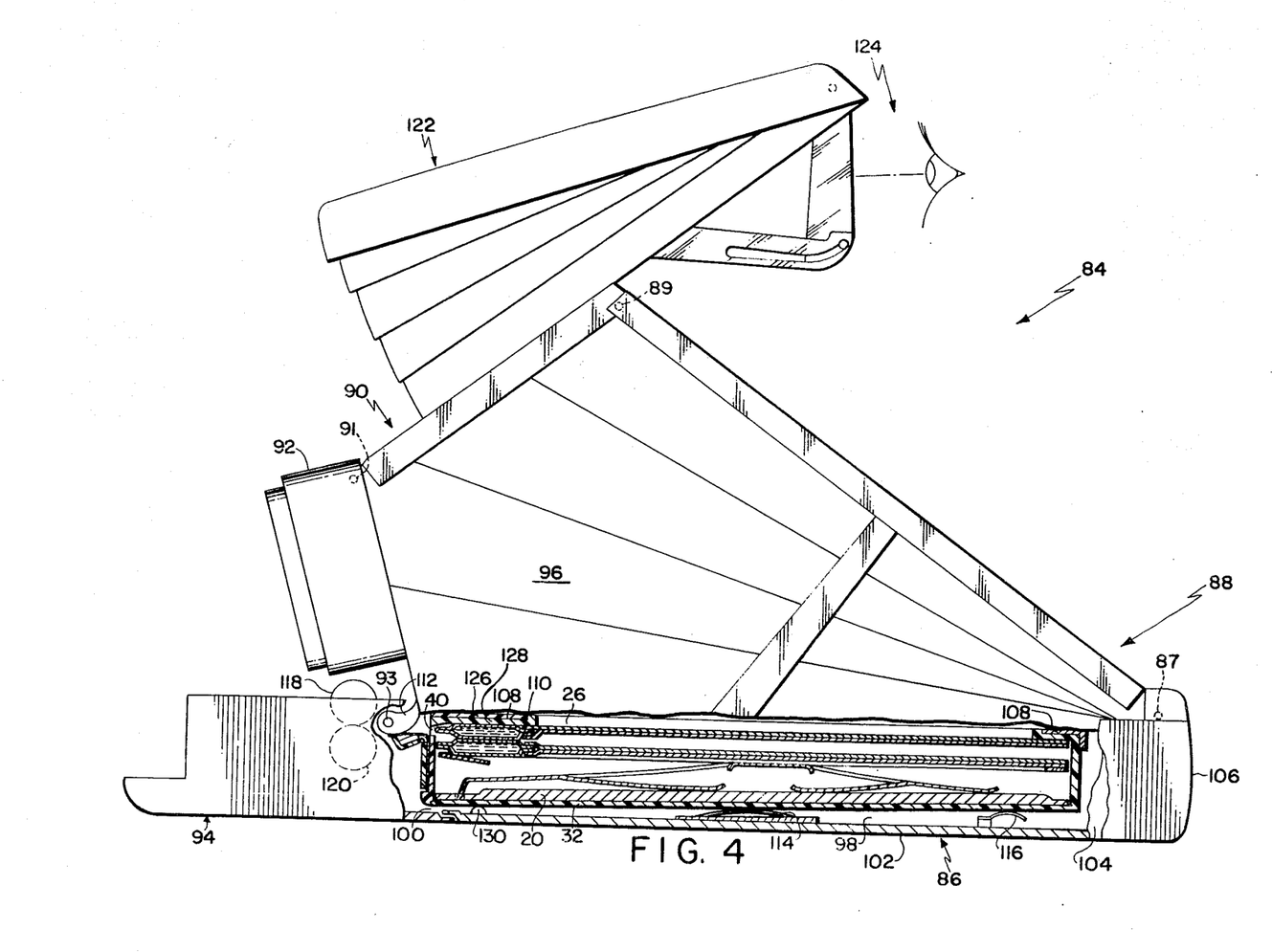
FIG. 4 is an elevational view, partly in section, of a camera having a film assemblage located at an operative position therein.

Camera 84 includes four housing sections 86, 88, 90, and 92, pivotally connected at pivots 87, 89, 91, and 93 for movement between a compact folded position and the extended operative position of FIG. 4, and a fifth housing section 94 pivotally coupled to and extended forwardly (to the left as viewed in FIG. 4) of housing section 86. Enclosing the space between the extended housing sections 86, 88, 90, and 92 to form the camera's exposure chamber is a foldable opaque bellows or envelope 96.

Housing section 86 is a generally parallepiped shaped structure which includes an open-ended chamber 98 therein for receiving the film assemblage 10. The open end 100 of chamber 98, through which film container 12 is adapted to be inserted, is located near the interface between housing sections 86 and 94. Access to opening 100 is provided by pivoting housing section 94 in a counterclockwise direction (as viewed in FIG. 4) relative to housing section 86.

Chamber 98 is formed by a rear or bottom wall 102, a pair of inner frame side walls 104 (only one of which is shown), a trailing end wall 106, and a top or forward wall 108. Chamber wall 108 is essentially a plate-like structure having a generally rectangular opening 110 therein with which the exposure aperture 26 of film container 12 is adapted to be aligned.

With housing section 94 located in the open position, film container 12 is inserted through opening 100, trailing end first, and is moved rearwardly (to the right as viewed in FIG. 4) into chamber 98. It will be noted that camera 84 includes a pair of brackets 112 (only one of which is shown) located near opening 100 for pivotally coupling housing section 92 to housing section 86. Brackets 112 are located adjacent the path of travel of the film container side walls 28 and engage and pivot the end cap 60 from the closed to the open position such that it is out of alignment with withdrawal slot 40.

Film container 12 is supported at its operative position within chamber 98 by plate 108 which bears against the exterior surface of forward wall 22, inner side walls 104 which bear against container side walls 28, and a spring support member 114, mounted on the interior surface of chamber wall 102, which bears against rear wall 32 of the film container 12.

When film container 12 is located at its operative position, the exposure aperture 26 in the forward wall 22 of film container 12 is aligned with aperture 110 in plate 108. Plate 108 serves to position container 12 such that the forwardmost film unit 16 is located at the camera's exposure plane (subsequent to removal of dark slide 14). A pair of electrical contacts 116 (only one of which is shown) extend through openings 42 in the rear wall 32 of the container 12 and make electrical contact to the electrodes on the underside of battery 20. Also, a film advancing mechanism (not shown) mounted in housing section 86 extends through opening 53 in the forward and trailing end walls of the film container 12 for engaging and advancing the forwardmost film unit 16 through withdrawal slot 40.

After film container 12 has been located at its operative position within chamber 98, housing section 94 is pivoted to its closed position thereby locating a pair of pressure applying members 118 and 120, mounted thereon, in operative relation with the film container withdrawal slot 40. Pressure applying members 118 and 120 preferably take the form of a pair of cylindrical, juxtaposed rollers having their axes of rotation substantially parallel to the leading end wall 36 of a film container located in chamber 98 such that the bite between the rollers is in a plane which includes withdrawal slot 40 and the camera's exposure plane.

The forwardmost film unit 16 is adapted to be exposed by image-bearing light transmitted through the aperture 110 in plate 108 and the exposure aperture 26 in the forward wall 22 of film container 12.

Camera 84, being of the single lens reflex type, is adapted to operate first in a viewing and focusing mode and then in an exposure and processing mode.

The camera's optical system includes an objective lens mounted in housing section 92; a planar mirror mounted on the interior surface of housing section 88; a plate-like reflex member pivotally mounted in housing section 86 at pivot 87 for movement between a viewing and focusing position in which the reflex member rests atop plate 108 in covering relation to aperture 110 and an exposure position in which it is positioned parallel with and adjacent to the planar mirror mounted on housing section 88; and a reflex type viewing device 122 mounted on housing section 90. The plate-like reflex member includes a reflective focusing screen on its top side facing housing sections 88 and 90 and a planar mirror on its underside facing receiving chamber 98.

During the viewing and focusing mode of operation, light from the objective lens is directed toward the mirror mounted on housing section 88 which reflects it downwardly onto the focusing screen covering aperture 110 to form an image of the scene to be photographed. Light emanating from the image on the focusing screen is directed back to the mirror mounted on housing section 88 which reflects it into the viewing device 122. A second image of the scene is formed by the viewing device 122 which may be viewed from an eye station designated 124.

After adjusting the objective lens such that the image of the scene is in sharp focus, the user actuates a button mounted on housing section 92 to initiate the exposure and processing mode of operation. A shutter behind the objective lens closes and an entrance pupil for the viewing device 122 is blocked to render the chamber, formed by the bellows 96, lighttight. The reflex member is pivoted upwardly such that the planar mirror on the underside faces the objective lens. The shutter is opened and light therefrom is reflected by the mirror on the underside of the reflex member through apertures 110 and 26 to cause exposure of photosensitive element 54 of the forwardmost film unit 16 through its transparent image-receiving element 56. After an appropriate exposure interval, the shutter is closed and the reflex member is returned to its viewing position. The shutter is then opened and the viewing device entrance pupil is unblocked.

As the reflex member is being returned to the viewing position, the film advance mechanism engages the exposed forwardmost film unit 16 and moves it through the withdrawal slot 40 into the bite of rollers 118 and 120. At least one of the rollers is driven in a direction to cause the film unit 16 to be advanced therebetween towards the exterior of the camera 84 (to the left as viewed in FIG. 4).

For a more detailed description of the camera's optical system and modes of operation reference may be had to the copending application of Peter F. Costa and Edward H. Coughlan, Ser. No. 141,554, filed on May 10, 1971, now U.S. Pat. No. 3,722,389, and assigned to the same assignee as the present invention.

As pod 52 passes between rollers 118 and 120, they apply compressive pressure to walls 65 of the pod causing the weaker seal 68 to rupture and discharge the mass of fluid 70 between the photosensitive sheet 54 and the image-receiving sheet 56. As described earlier, the distribution control projections 78a, 78b, and 78c, located on the interior surface of container forward wall 22, (or the bearing surfaces such as 82, 202, or 302 of the several alternative embodiments described) in cooperation with the support member 18, apply a second compressive pressure to the central portion of the film unit 16 in the path of the liquid wave front 76. The center section of the wave front 76 travelling in a direction parallel to the direction of film advancement is thereby retarded causing a flow of fluid in a direction transverse of the direction of film advancement to more evenly distribute the layer of fluid 70 within the laminate.

It was described earlier in the disclosure that the plastic walls of film container 12 were relatively thin and therefore flexible. It will be apparent to one skilled in the art that in order for the distribution control members to function properly they must be accurately positioned with respect to the forwardmost film unit 16.

In a preferred embodiment, the forwardmost film unit 16 is located at the camera's exposure plane and is adapted to be moved in a film exit plane into the bite of the rollers 118 and 120. Depending on the design of the camera, the film exit plane may or may not coincide with the exposure plane. Therefore, it is important to accurately locate the distribution control projections 78 such that they bear against the top surface of the forwardmost film unit 16 with the desired amount of pressure to effect uniform fluid distribution as the film unit is advanced along the film exit plane. Since the distribution control members are generally integrally formed with the forward wall 22 of the film container 12, their location with respect to the forwardmost film unit 16 will, at best, be uncertain because of the flexibility of the forward wall 22.

In order to accurately locate the distribution control members, certain of the structural members forming chamber 98 are configured to engage and dimensionally stabilize film container 12 when it is located at its operative position therein. For example, that portion 126 of the plate 108, which is positioned over the portion 128 of forward wall 22 between upstanding rib 24 and the leading end of forward wall 22, provides a bearing surface which restrains any upward bowing or distortion of forward wall portion 128. Also, inner frame side walls 104 bear against container side wall 28 to provide lateral support for the leading end of the container 12. The rigidity of the container is also enhanced by a support surface 130, which may be integrally formed with the bottom wall 102 of chamber 98 to bear against the leading end of the container rear wall 32.

It will be understood that portion 126 of plate 108 may be suitably configured to engage and restrain a film container having a non-planar forward wall portion such as in the embodiment shown in FIG. 7.

In this manner, the normally flexible walls of the container 12 are restrained and dimensionally stabilized when the container is located at its operative position within chamber 98 and camera 84 is provided with means for accurately locating distribution control members, forming an integral part of a film assemblage, in relation to a film unit located at an exposure position therein.

In summary, a novel system for uniformly spreading a liquid processing composition within a self-developing film unit laminate has been provided.

The system features a photographic film assemblage including a container holding at least one film unit therein which is adapted to be exposed and then treated with a liquid processing composition, and means associated with the container, so as to form an integral part of the assemblage, for controlling the distribution of the liquid during treatment of the film unit.

The system also includes photographic apparatus, preferably a camera, into which the film assemblage is adapted to be inserted to locate the film unit at an exposure position therein. The camera is provided with pressure applying means for spreading the liquid processing composition between and in contact with superposed elements of the film unit and means for engaging and dimensionally stabilizing the container to accurately locate the distribution control means in operative association with the film unit positioned for exposure.

A major advantage of such a system is that several different types of film assemblages, i.e., each having distribution control means that are uniquely configured for the particular type of film unit contained therein, may be utilized with the same camera.

The distribution control means may include one or more projections (or a bearing surface defined by recesses or openings in the forward wall of the container) integrally formed with the forward wall of the container near the withdrawal slot.

In operation, the distribution control means selectively apply a compressive pressure to the central portion of the film unit to retard the center of the liquid wave front of processing fluid thereby causing a flow of fluid outwardly towards the lateral margins of the film unit to achieve more uniform fluid distribution.

Since certain changes may be made in the above photographic film assemblage and photographic apparatus without departing from the scope of the invention herein involved, it is intended that all matter contained in the above description or shown in the accompanying drawings shall be interpreted as illustrative and not in a limiting sense.

We claim:

1. A method of distributing a processing fluid between predetermined layers of a film unit provided in a film container which is adapted to be inserted into and supported in a photographic apparatus for locating said film unit in said film container in position for exposure, said film container being of the type which further includes an exposure aperture through which said film unit is adapted to be exposed, a withdrawal slot through which said film unit is adapted to be withdrawn from said film container, said fluid distribution control means in said film container adjacent said withdrawal slot, said method comprising the steps of: progressively advancing said film unit from said exposure position in said film container past
- said fluid distribution control means adjacent said withdrawal slot, through said withdrawal slot, and between pressure applying means mounted on said apparatus;
- applying a first compressive pressure to said film unit with said pressure applying means to dispense a fluid processing composition, from a container associated with said film unit, between predetermined layers of said film unit and for advancing said fluid along a wave front between said layers as said film unit is advanced relative to said pressure applying means; and
- simultaneously applying a second compressive pressure to said film unit with said fluid distribution control means adjacent said withdrawal slot to modify the shape of said liquid wave front to effect a more substantially uniform distribution of said fluid between said layers;
- said first compressive pressure being applied across the entire width of an image forming area of said film unit and said second compressive pressure being applied to only a portion of the width of said image forming area.

\* \* \* \* \*